United States Patent [19]
Härtel et al.

[11] Patent Number: 5,417,059
[45] Date of Patent: May 23, 1995

[54] BURNER SYSTEM FOR DETOXIFICATION OR CLEANING THE EXHAUST GASES OF AN INTERNAL COMBUSTION ENGINE

[75] Inventors: Günter Härtel, Neuss; Armin Schürfeld, Meerbusch; Riedel Röttges, Tönisvorst; Matthias Hullmann, Kaarst, all of Germany

[73] Assignee: Pierburg GmbH, Neuss, Germany

[21] Appl. No.: 156,214

[22] Filed: Nov. 22, 1993

[30] Foreign Application Priority Data

Nov. 20, 1992 [DE] Germany .................. 42 39 079.6

[51] Int. Cl.⁶ ............................................. F01N 3/20
[52] U.S. Cl. ............................... 60/276; 60/286; 60/303
[58] Field of Search ............... 60/303, 286, 274, 276

[56] References Cited

U.S. PATENT DOCUMENTS

| | | | |
|---|---|---|---|
| 3,189,416 | 6/1965 | Clarke | 60/303 |
| 3,203,168 | 8/1965 | Thomas | 60/30 |
| 4,604,868 | 8/1986 | Yoshitaka et al. | 60/286 |
| 4,651,524 | 3/1987 | Brighton | 60/274 |
| 4,987,738 | 1/1991 | Lopez-Crevillen | 60/286 |
| 5,038,562 | 8/1991 | Goerlich | 60/274 |
| 5,063,737 | 11/1991 | Lopez-Crevillen | 60/286 |
| 5,067,320 | 11/1991 | Kanesaki | 60/303 |
| 5,094,075 | 3/1992 | Berendes | 60/303 |
| 5,320,523 | 6/1994 | Stark | 60/303 |

FOREIGN PATENT DOCUMENTS

| | | |
|---|---|---|
| 2219371 | 2/1973 | Germany . |
| 3835939 | 5/1989 | Germany . |
| 4132814A1 | 4/1993 | Germany . |
| 59-41620 | 3/1984 | Japan . |

*Primary Examiner*—James C. Yeung
*Assistant Examiner*—Daniel J. O'Connor
*Attorney, Agent, or Firm*—Ladas & Parry

[57] ABSTRACT

A burner system for cleaning exhaust gases in the exhaust line of an internal combustion engine during start-up of the engine. The burner system serves to heat the catalytic convertor during start-up. The burner system has a burner including a combustion chamber for supplying combustion gases to the catalytic converter. A fuel line connected to the fuel injection system of the engine supplies fuel to the burner and a fuel regulator is provided in the fuel line. A secondary air supply system supplies secondary air to the burner and includes an air fan, an air line connecting the air fan to the burner and a pressure regulator in the air line. The pressure regulator is subjected to the pressure prevailing in the combustion chamber or in the exhaust line for the exhaust gases of the internal combustion engine.

16 Claims, 4 Drawing Sheets

BURNER SYSTEM FOR DETOXIFICATION OR CLEANING THE EXHAUST GASES OF AN INTERNAL COMBUSTION ENGINE

FIELD OF THE INVENTION

The invention relates to a burner system for the detoxification or cleaning of the exhaust gases of an internal combustion engine.

BACKGROUND

The first one to two minutes after starting a cold engine are decisive for the emission of pollutants from an internal combustion engine.

In this time approximately 70–80% of the total emission of HC and CO are discharged. Since the catalytic converter has not reached its operating temperature during this time interval, the engine discharges almost the crude emission products without catalytic conversion.

Various means are known for reducing the emissions, for example, by heating the catalytic converter with a burner system (as disclosed in DE-A2,219,371).

A secondary air system is disclosed in the Pierburg product information brochure "Electric Secondary Air Pump" No. 5/4 00-151 01, 9/91, published at the International Automobile Exhibition, Frankfurt/Main, 1991, which provides for the intake of secondary air into the exhaust manifold during the cold phase, when the catalytic converter of the internal combustion engine is not yet operative.

In this way, the pollutants CO and HC, which are formed in the cold phase due to an engine-side air index of lambda <1, are reduced, and heat is introduced into the catalytic converter for obtaining a more rapid operation-ready state after the cold start. The secondary air intake system consists of an air pump, one or more check valves and a cut-off valve.

In order to achieve operation readiness still more rapidly, in connection with this secondary air system, a process is disclosed in unpublished Patent Application DE-P41 32 814 A1, in which the catalytic converter is heated by a burner operating with the fuel of the internal combustion engine, and air for combustion is supplied to the burner system, by an air pump of the secondary air system.

Depending on the field of application of a burner system in the exhaust and/or intake system of an internal combustion engine, various requirements on the operating parameters exist, such as, for example, the pressure in the combustion chamber of the burner system, which may lead to an adverse influence on the burner function.

SUMMARY OF THE INVENTION

An object of the present invention is to provide means for fulfilling the respective requirements of a burner system and for avoiding the disturbing effects, so that the burner system may be operated in diverse fields of use.

A further object of the invention is to provide a burner system having a particular structural configuration of the combustion chamber itself and of control means for conducting the combustion air and the fuel to the combustion chamber.

The emission of HC and CO can be considerably reduced or its output time can be considerably reduced after a cold start of the internal combustion engine with the burner system of the invention.

The burner system can also be used in a device for cleaning the exhaust of diesel internal combustion engines, consisting of a filter device for collecting carbon particles and a burner device for burning off the particles deposited on the filter, such as given, for example, in Patent Application DE P42 29 103.B.

A simple solution has been found for the burner system, which can be realized at low construction costs.

DETAILED DESCRIPTION

Figure 1:
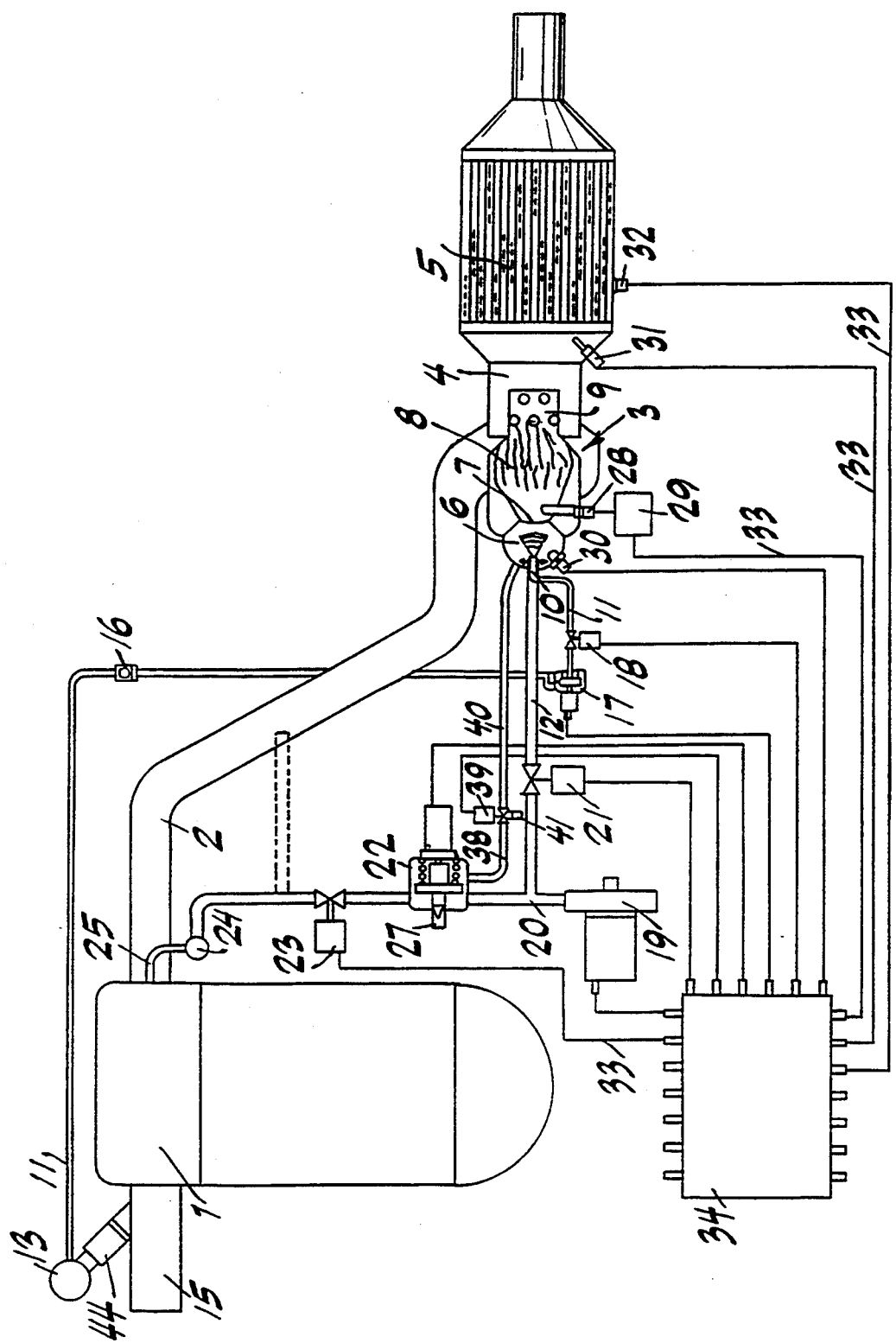
FIG. 1 diagrammatically illustrates an embodiment of a burner system for the initial heating of a catalytic converter.

FIG. 1 shows the overall arrangement of a burner system for the initial heating of a catalytic converter.

An exhaust line 2 extends from an internal combustion engine 1 to a burner 3, which is joined to a catalytic converter 5 by means of an exhaust mixing segment 4. Burner 3 consists of a mixture preparation chamber 6, a mixture outlet aperture 7 and a combustion chamber 8 having an outlet 9. A spray nozzle 10 opens into mixture preparation chamber 6. Fuel is supplied to the nozzle 10 by a fuel line 11, and combustion air is supplied by an air line 12.

The fuel for the burner system is derived from the fuel which feeds injection valves 14 arranged in intake air channels 15 of the internal combustion engine. A safety shutoff valve 16, a fuel regulator 17, and a fuel shutoff valve 18 are arranged in fuel line 11.

The combustion air for the burner system is supplied by a secondary air pump 19 from the atmosphere through an air filter (not shown) and transported into a branching secondary-air pressurized line 20. The air line 12 extends from line 20 to spray nozzle 10 via a shutoff valve 21. The secondary-sir line 20 also extends to a pressure regulator 22 and to a shutoff and timing valve 23. The distribution of the secondary air can alternatively be produced either by means of a secondary air distributor line 24 and a small intake tube 25 connected to the cylinder outlet channels in the vicinity of the outlet valves in the cylinder head of the internal combustion engine or it can be supplied by means of a line 26 shown in dotted lines to the collecting tube of the exhaust line 2. The secondary-air is supplied in excess and released into the atmosphere by the secondary-air pressure regulator 22. In order to avoid the effect of the exhaust counterpressure on the quantity of combustion air and secondary-air, a return chamber of the secondary air pressure regulator 22, upon operation of the secondary-air pump 19, is connected to the combustion chamber of burner 3, or the mixture preparation chamber 6, or exhaust line 2, by means of a reference pressure line 38, a reference pressure reversal valve 39 and an exhaust pressure line 40. When the secondary-air pump 19 is stopped, the secondary-air pressure regulator 22 is connected to atmospheric pressure by means of the reference pressure reversal valve 39 via an atmospheric pressure line 41. An ignition electrode 28, which is controlled by means of an ignition module 29, serves for igniting the combustion mixture in combustion chamber 8. A flame monitor 30 is arranged in the region of the mixture preparation chamber 6 or combustion chamber 8 for monitoring the burner function. Further, a lambda probe 31 is provided, in addition to or alternatively to the conventional site of incorporation, directly between the exhaust mixing segment 4 and the catalytic converter 5 for detecting the exhaust mixture introduced into the catalytic converter 5. A temperature sensor 32 serves for detecting the temperature of the catalytic converter 5 at the outer wall or the interior thereof. All of the components of the burner system are connected to an electronic control device 34 by means of connections 33, and this control device forms a structural unit with the management control unit of the internal combustion engine or has an interface with the latter.

Figure 2:
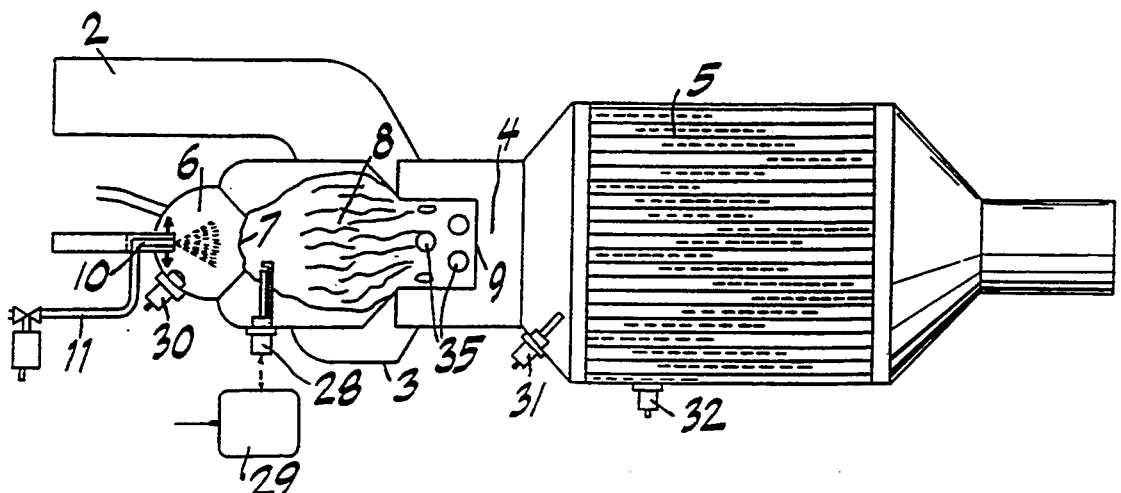
FIG. 2 is an enlarged view of a detail of FIG. 1, FIGS. 3, 4 and 5 illustrate modifications of the embodiment according to FIG. 1.

A spraying of the fuel, supported by air, is produced, as seen in FIG. 2, in the mixture preparation chamber 6 by the partial flow of combustion air occurring centrally at spray nozzle 10. The fuel sprayed along the central axis in the form of a spray cone and the fuel is surrounded by an air mantle, with the air distributed radially as shown by the arrows, and igniting is effected by means of ignition electrode 28 leading to flame stability in combustion chamber 8. The flame begins in the region of the mixture outlet aperture 7 and extends up to the region of combustion chamber outlet 9. The engine exhaust flowing through exhaust line 2 mixes first with the exhaust gases from combustion chamber 8 in the region of combustion chamber outlet 9, since if this were not so, the combustion in the combustion chamber would be adversely affected. The combustion chamber is configured such that it is closed in the region of the flame and it has a reduced cross section in the region of combustion chamber outlet 9. The two flows of exhaust gases first meet in the region of the burning flame i.e. at boreholes 35, whereby a mixing of the two flows of exhaust gases will be promoted by means of the boreholes 35 in the region of exhaust mixing segment 4. The lambda probe 31 is arranged downstream of exhaust mixing segment 4 in order to be able to measure the composition of the total mixture after mixing has been concluded.

Figure 3:
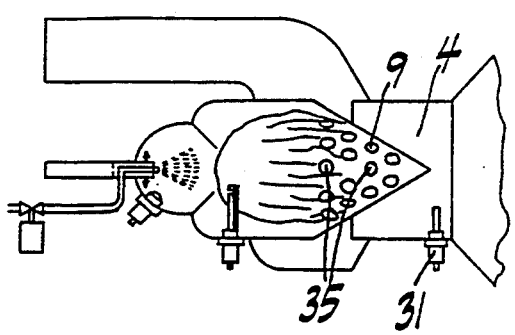

FIG. 3 shows a modified form of burner 3, in which the combustion chamber outlet 9 has the form of a cone whose wall contains the boreholes 35. In this case, the mixing of the two flows of exhaust gases can still be forcibly undertaken by the selected arrangement of the boreholes 35, whereby it is possible to arrange the lambda probe 31 in the region of exhaust mixing segment 4. In another advantageous embodiment, the combustion chamber outlet 9 can be spherical in shape.

Figure 4:
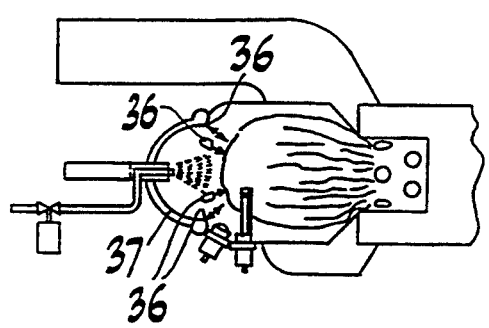

FIG. 4 shows a modified form of burner 3, in which the mixture outlet aperture 7 between the mixture preparation chamber 6 and combustion chamber 8 according to FIG. 1-3 has been replaced by a row of small outlet tubes 36 for the combustion air. Instead of the radially directed combustion air at spray nozzle 10 according to FIGS. 1-3, the combustion air is supplied by means of connection line 37 and the combustion air is blown into the separating region of the two chambers by means of outlet tubes 36.

Figure 5:
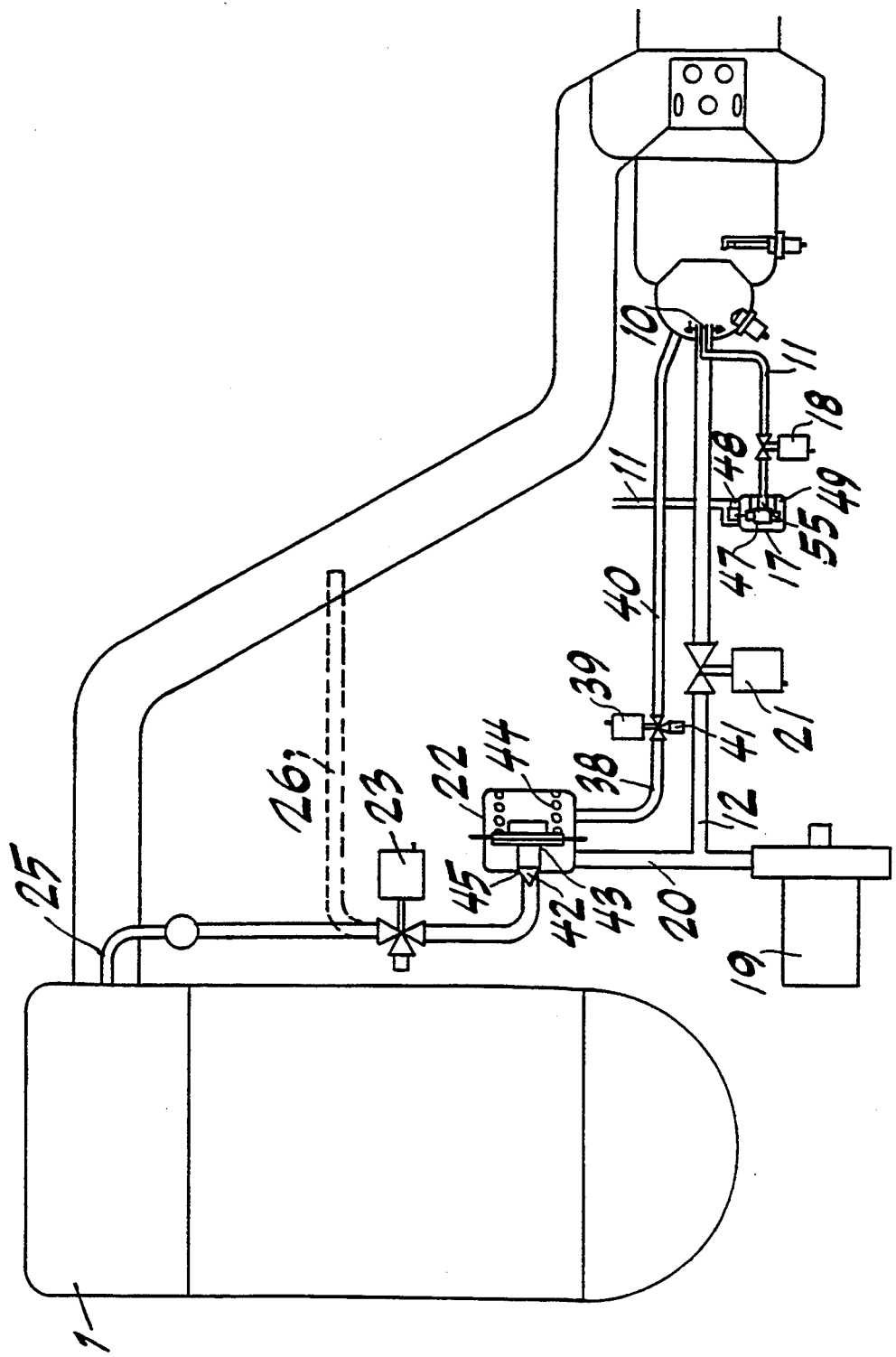

FIG. 5 shows a burner system designed for a constant burner power and constant lambda. The secondary air pump 19 is placed in operation upon switching on the ignition, with the not-yet warmed-up catalytic converter 5, and supplied with full power. The supply of burner 3 with combustion air is only necessary until the front part of catalytic converter 5 is warmed up after 15-20 seconds or a predetermined threshold temperature has been reached in the catalytic converter. Burner 3 is preferably adjusted to a lambda value just above 1 (the precise mixing ratio). For a constant burner power and constant lambda, thus a constant quantity of burner air is also necessary per unit of time. Since the transport characteristic of secondary air pump 19 can change in the course of the operating time and the transported quantity is also dependent on the exhaust counterpressure, the secondary-air pressure regulator 22, which is described below and which is shown with its individual parts, is required in order to avoid a change in the quantity of combustion air.

A valve closing unit 42 is connected to a membrane 43 of the regulator 22 and is pressed against a valve seat 45 in the rest position by means of the force of a pressure spring 44. When the burner is operating, the combustion air shutoff valve 21 is open and the air is transported from secondary-air pump 19 to spray nozzle 10. The concentric outlet for spraying the fuel and boreholes for the radially directed air (not shown) are dimensioned such that the air quantity required by the burner is precisely supplied at a specific pressure to the combustion-air line 12. Corresponding to this pressure, which acts against the force of pressure spring 44 on membrane 43, the spring force is dimensioned such that starting from this pressure, the closing unit 42 opens, and the quantity of air supplied in excess flows out over valve seat 45. For the case when the transport characteristic of the secondary-air pump 19 has changed, this change does not act on the supplied quantity of combustion air, since the pressure is still maintained due to the function of the secondary-air pressure regulator 22 and only the quantity supplied in excess changes. In this way, it is assumed that the exhaust counterpressure is negligibly small.

In the case of higher rpm's and load, the exhaust counterpressure increases, however, to values which lead to a reduction in the pressure difference at spray nozzle 10, whereby the supplied combustion air is also reduced and the lambda value is changed greatly in direction. In order to compensate for this disruptive factor, the exhaust counterpressure is supplied to the membrane chamber of secondary-air pressure regulator 22 containing spring 44, by means of exhaust pressure line 40, reference pressure reversal valve 39 and reference pressure line 38.

Thus, the controlled pressure of the pressure regulator increases by the amount of exhaust counterpressure, whereupon it is assured that the pressure difference at spray nozzle 10 and thus also the quantity of combustion air remains substantially constant in the total performance characteristics of the internal combustion engine. The secondary air pump 19 thus transports the quantity of combustion air in excess against the increased pressure. The secondary air transported in excess is introduced to the engine exhaust of the individual cylinders by means of intake tubes 25 in the region of the outlet valves in the embodiment according to FIG. 5 by means of the secondary-air shutoff and timing valve 23, or as is shown by the dotted lines, is mixed with exhaust gases in exhaust line 2 by means of the line 26. In the former case, the secondary air can be utilized in the region of the outlet valves for the combustion of CO and HC. Of course, is also possible to dispense with the mixing of the secondary air transported in excess with the exhaust gases, and the excess secondary air is blown off into the atmosphere after the secondary-air pressure regulator as in the embodiment according to FIG. 1 by means of outlet line 27.

The supply of secondary air serves for uniform heating of the catalytic converter during the burner operation. On the one hand, the introduction of air into the flow of exhaust gases of the internal combustion engine prevents the front surface of the catalytic converter from being overheated at the intake side due to the reduction in the mixing temperature in the exhaust mixing segment 4, and on the other hand, the heating of the catalytic converter is sufficiently great due to the increased flow velocity. The reduction in the mixing temperature in front of the catalytic converter is then of particular importance, if the burner is started by means of a priority switch a few seconds prior to the start of the internal combustion engine and thus no exhaust is produced from the internal combustion engine. This method is advantageous with respect to a reduction in the exhaust emission upon starting the engine.

After reaching the operating temperature of the catalytic converter, the burner is disconnected. For this purpose, combustion air shutoff valve 21 and fuel shutoff valve 18 are closed. Insofar as the internal combustion engine at this point in time can be operated with a mixture of lambda=1 with respect to its operational behavior, no other supply of secondary air is necessary, since the lambda=1 control can be produced by controlling the injection quantity.

If the start of the engine occurs at lower temperatures, then a mixture less than lambda=1 is necessary in the first few minutes with respect to the operational behavior of the internal combustion engine. Also in this case it is advantageous, in the interest of lower emissions, to begin with the lambda=1 control after reaching the operating temperature of the catalytic converter.

The assumption for this is, of course, that the lambda probe 31 has already reached its operating temperature and the supply of secondary air via the warmup phase of the catalytic converter 5 is maintained throughout by means of the secondary-air pump 19. The measurement of secondary air is hereby taken over by control of the secondary-air shutoff and timing valve 23 by means of the lambda control. If necessary, the secondary-air shutoff and timing valve 23 may also be embodied as a ⅜-way valve (reversing the process of metering and discharge into the atmosphere), in order thus to improve the supply of small quantities of secondary air. With increasing emission possibility of the internal combustion engine during warm-up, the secondary-air quantity must be continually reduced by means of the lambda control, until the engine exhaust reaches lambda=1 without secondary-air addition. Then the secondary-air pump 19 can be disconnected and the fuel metering for the engine can be reversed by adjusting to lambda=1 control.

Figure 6:
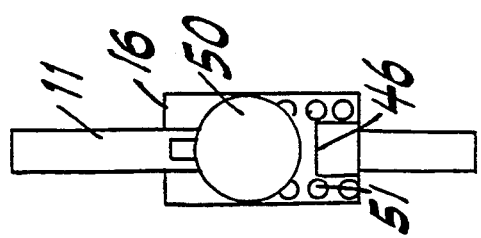
FIG. 6 shows a detail of FIG. 1.

The introduction of fuel is produced with the use of the burner system for rapid heating of the catalytic converter, preferably by fuel line 11 branched from the fuel distributor. The metering of a constant quantity of fuel is produced by means of fuel regulator 17, as is shown in its individual features in FIG. 5. The pressure prevailing in fuel line 11 is conducted into two membrane chambers of fuel regulator 17, which are divided by a membrane 47, whereby a fuel nozzle 48 and a pressure spring 49 in this membrane chamber in the influx into the membrane chamber are arranged from the fuel line 11, and this pressure spring operates, in the open direction a closing unit 55 rigidly joined with membrane 47. During operation (fuel shutoff valve 18 open), the connection of the membrane chamber with fuel line 11 is closed by closing unit 55 to the extent that a pressure difference is set up between the membrane chambers and thus also on fuel nozzle 48, whose force precisely counterbalances pressure spring 49. Depending on this pressure difference and the cross section of fuel nozzle 48, a fuel throughput is adjusted, which is introduced into spray nozzle 10 from fuel regulator 17 via fuel line 11 and fuel shutoff valve 18. The quantity metered by the fuel regulator is independent within broad limits of the pressure in fuel line 11 and the pressure in the mixture preparation chamber 6. The safety shutoff valve 16, as shown as an individual component in FIG. 6, serves for avoiding an uncontrolled release of fuel in the case of a defect in fuel line 11 (crash test). In the case when the fuel throughput increases clearly above the normal value of the throughput in fuel regulator 17, a pressure difference arises on a closing unit 50 due to the constricted free flow cross section for the housing of safety shutoff valve 16, and the force of this pressure difference on closing unit 50 is greater than the force of a valve spring 51. Therefore, closing unit 50 moves against the force of the valve spring in the direction of a valve seat 46 and closes the latter, whereupon the flow of the fuel is interrupted as long as an overpressure is present in fuel line 11 upstream of safety shutoff valve 16.

Figure 7:
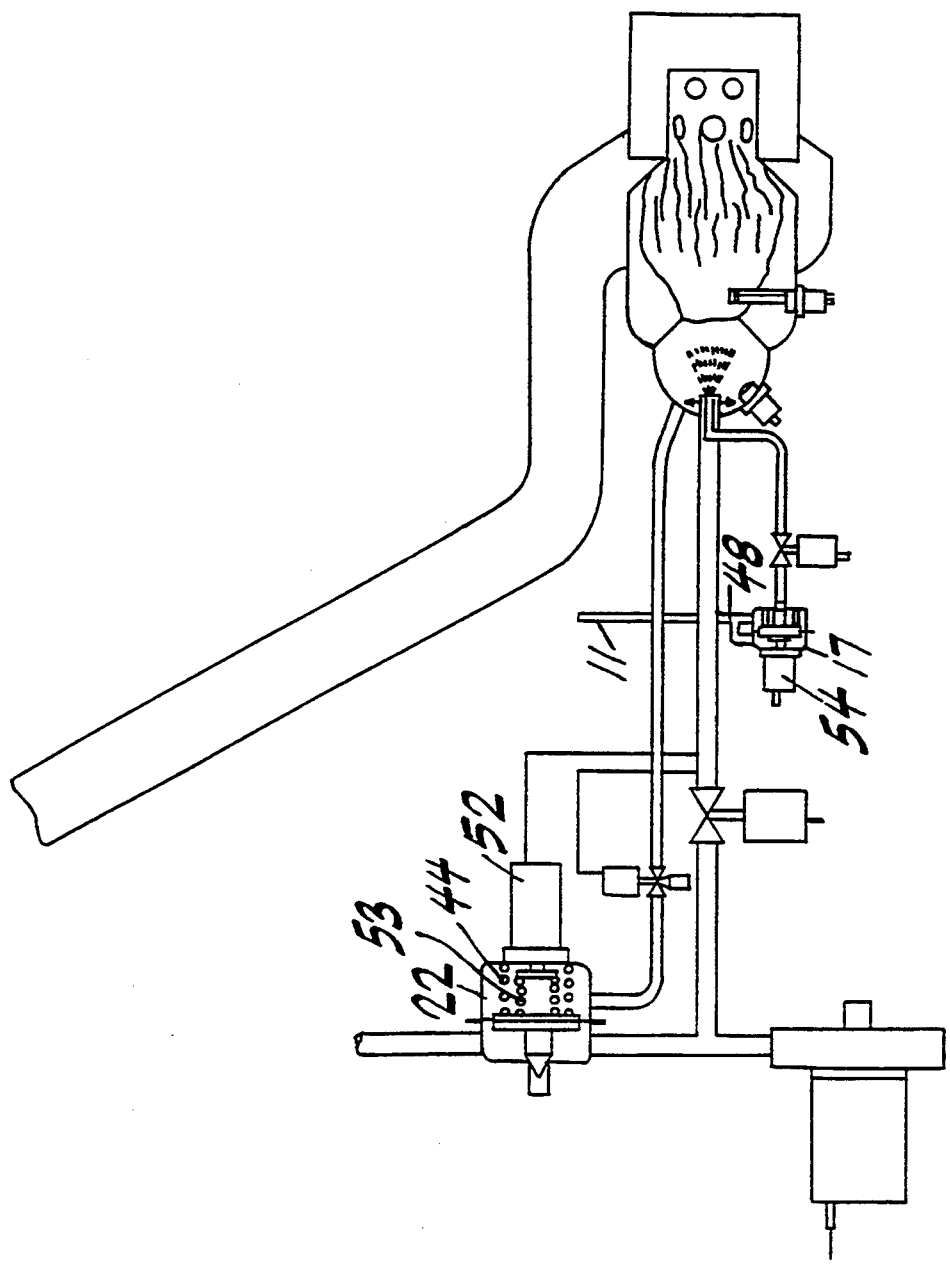
FIG. 7 shows another modification of the embodiment according to FIG. 1.

FIG. 7 shows a burner device with variable burner power, which is required for certain applications, such as, for example, for preheating of the intake air upon cold starting of diesel engines or for a regeneration of diesel filters by burning, and can be obtained with small additional expense with the system components of the fuel regulator 17 and the secondary-air pressure regulator 22, as will be described below.

The quantity of combustion air may be varied by variation of the secondary-air pressure by changing the force of pressure spring 44 directly or by means of additional spring 53, for example, with an electronically controllable motor operator 52.

The quantity of fuel may be changed by the variation of the pressure difference at fuel nozzle 48 of fuel regulator 17, for example by means of an electronically controllable solenoid 54.

It is possible with the device according to FIG. 7, in combination with electronic control device 34, to adapt both the burner power and the mixing ratio of the combustion mixture to the respective requirements in the desired way.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A burner system for cleaning exhaust gases in the exhaust line of an internal combustion engine comprising a catalytic converter, a fuel injection system, a burner means including a combustion chamber for supplying combustion gases to the catalytic converter, a fuel line connected to the fuel injection system and the burner means to supply fuel from the fuel injection system to the burner means, a fuel regulator in said fuel line, secondary air supply means for supplying secondary air to said burner means, said secondary air supply means comprising an air pump for producing compressed air in an amount in excess of the amount needed for combustion of fuel in the combustion chamber, an air line connecting said air pump to said burner means, a pressure regulator connected to said air line to provide flow of secondary air from the air pump to the burner means at substantially constant pressure, and means for subjecting said pressure regulator to pressure prevailing in the combustion chamber so that said substantially constant flow of secondary air passes to said burner means, and a further line connected to said pressure regulator to convey excess air produced by the air pump to said exhaust gases, and an electronic control means connected to at least one of said regulators for controlling the same in response to pressure in said burner means.

2. A burner system according to claim 1, said burner means comprising a mixture chamber for air and fuel connected to said combustion chamber, a spray nozzle for supplying fuel and air into said mixture chamber, and an ignition electrode in said combustion chamber for igniting the fuel and air mixture therein.

3. A burner system according to claim 2, wherein said mixture chamber has an outlet aperture which opens into said combustion chamber in the vicinity of which the fuel and air are ignited by said electrode to produce a flame which extends into said combustion chamber.

4. A burner system according to claim 3, comprising an exhaust mixing segment connected to said exhaust line for receiving said exhaust gases and for supplying said exhaust gases to the catalytic converter, said combustion chamber having an outlet connected to said exhaust mixing segment to combine the exhaust gases from the internal combustion engine with exhaust gases from said combustion chamber.

5. A burner system according to claim 4, wherein said combustion chamber outlet has boreholes arranged to provide mixing of the engine exhaust gases and the exhaust gases from the combustion chamber.

6. A burner system according to claim 5, wherein said combustion chamber outlet is conical in shape.

7. A burner system according to claim 3, wherein said outlet aperture is formed by an annular row of tubes connected to the air line to supply combustion air to said mixture chamber.

8. A burner system according to claim 1, wherein at least one of said fuel line and air line includes a safety shutoff valve.

9. A burner system according to claim 1, comprising a secondary air intake in combination with said air line including a secondary air shutoff and timing valve.

10. A burner system according to claim 1, further comprising a priority switch to operate said burner means prior to starting the internal combustion engine.

11. A burner system according to claim 1, including means for operating the burner system with constant or variable power.

12. A burner system according to claim 3, wherein said mixture chamber has a spherical shape.

13. A burner system according to claim 2, comprising a vent line to atmosphere connected to said pressure regulator for selectively venting excess secondary air to the atmosphere.

14. A burner system according to claim 2, comprising a shutoff valve in said further line connected to the pressure regulator, said electronic control means being connected to said shutoff valve.

15. A burner system according to claim 2, comprising a lambda probe mounted beyond an outlet of said combustion chamber, said lambda probe being connected to said electronic control means.

16. A burner system according to claim 2, comprising a temperature sensor for detecting temperature in the catalytic converter, said temperature sensor being connected to said electronic control means to provide a signal when operating temperature of the catalytic converter has been reached to halt the supply of fuel and secondary air to the burner means and cease operation thereof.

* * * * *